United States Patent [19]

Yoshifuji

[11] Patent Number: 5,537,405

[45] Date of Patent: Jul. 16, 1996

[54] CROSS-CONNECTING MODULE

[75] Inventor: Yuuki Yoshifuji, Tokyo, Japan

[73] Assignee: NEC Corporation, Tokyo, Japan

[21] Appl. No.: 339,197

[22] Filed: Nov. 10, 1994

[30] Foreign Application Priority Data

Nov. 10, 1993 [JP] Japan .................................. 5-304685

[51] Int. Cl.$^6$ .................................................. H04R 11/04
[52] U.S. Cl. ..................................................... 370/60.1
[58] Field of Search .......................... 370/60.1, 60, 94.1, 370/94.2, 50, 53, 112, 100.1, 105.1, 99, 108, 102, 110.1; 375/354, 355, 363, 364, 365, 366

[56] References Cited

U.S. PATENT DOCUMENTS 4,656,625  4/1987  Nojiri et al .............................. 370/112

OTHER PUBLICATIONS

"Sonet is emerging as one of the important Global data transport schemes of the decade", Kessler, Jul. 1991, pp. 36–46.

Primary Examiner—Douglas W. Olms
Assistant Examiner—Dang Ton
Attorney, Agent, or Firm—Sughrue, Mion, Zinn, Macpeak & Seas

[57] ABSTRACT

A cross-connecting module includes a demultiplexing unit, a first replacing unit, a cross-connecting unit, a second replacing unit, and a multiplexing unit. The demultiplexing unit sequentially byte-interleave-demultiplexes multiplexed transmission data into a plurality of demultiplexed data. The first replacing unit replaces pointer information indicating a leading address of a data storage area of each of the second and subsequent demultiplexed data, which are byte-interleave-demultiplexed by the demultiplexing means, with pointer information indicating a leading address of a data storage area of the first demultiplexed data. The cross-connecting unit cross-connects the first demultiplexed data from the demultiplexing unit with the second and subsequent demultiplexed data from the first replacing unit. The second replacing unit replaces the pointer information of each of the second and subsequent demultiplexed data from the cross-connecting unit with a preset specific value. The multiplexing unit byte-interleave-multiplexes the first demultiplexed data from the cross-connecting unit with the second and subsequent demultiplexed data from the second replacing unit.

10 Claims, 13 Drawing Sheets

| A1 | A2 | C1 |
|----|----|----|
| B1 | E1 | F1 |
| D1 | D2 | D3 |
| H1 | H2 | H3 |
| B2 | K1 | K2 |
| D4 | D5 | D6 |
| D7 | D8 | D9 |
| D10 | D11 | D12 |
| Z1 | Z2 | E2 |

FIG. 4A

| A1 | A2 | C1 |
|----|----|----|
|    |    |    |
|    |    |    |
| H1* | H2* | H3 |
| B2 |    |    |
|    |    |    |
|    |    |    |
|    |    |    |
| Z1 | Z2 |    |

FIG. 4B

| A1 | A2 | C1 |
|----|----|----|
|    |    |    |
|    |    |    |
| H1* | H2* | H3 |
| B2 |    |    |
|    |    |    |
|    |    |    |
|    |    |    |
| Z1 | Z2 |    |

FIG. 4C

| A1 | A2 | C1 | | | |
|----|----|----|---|---|---|
|    |    |    |   |   |   |
|    |    |    |   |   |   |
| H1 | H2 | H3 |   |   |   |
| B2 |    |    |   |   |   |
|    |    |    |   |   |   |
|    |    |    |   |   |   |
|    |    |    |   |   |   |
| Z1 | Z2 |    |   |   |   |

FIG.5

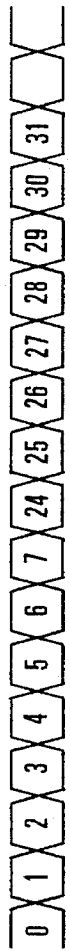

CROSS-CONNECTING MODULE

BACKGROUND OF THE INVENTION

The present invention relates to a cross-connecting module and, more particularly, to a cross-connecting module for switching transmission lines of higher orders.

Conventionally, a cross-connecting module of this sort performs cross-connection by using an STS1 signal having an overhead format as illustrated in FIG. 12 as a unit. This STS1 signal is a signal of SONET (Synchronous Optical NETwork) standard.

As in FIG. 12, the overhead of the STS1 signal consists of transport overhead 33 including section overhead 31 and line overhead 32, and path overhead 34.

On the other hand, in cross-connecting an STS3 signal formed by multiplexing three STS (Synchronous Transport Signal) 1 signals and having an overhead format as shown in FIG. 13, this STS3 signal is byte-interleave-demultiplexed into three STS1 signals, and cross-connection is performed for each of these three STS1 signals.

As in FIG. 13, the overhead of the STS3 signal consists of transport overhead 37 including section overhead 35 and line overhead 36.

That is, as depicted in FIG. 10, the start bit of an input STS3 signal is detected by a synchronous circuit 1. On the basis of the start bit thus detected, the STS3 signal is byte-interleave-demultiplexed by a demultiplex circuit 2.

Three STS1 signals obtained by the byte-interleave-demultiplex performed by the demultiplex circuit 2 are stored in elastic memories 3, 4, and 5 for absorbing phase differences and applied to a cross-connecting module 11 via interface circuits 8, 9, and 10, respectively.

Note that each of the interface circuits 8 to 10 also checks, on the basis of bytes H1 and H2 as the pointers of the STS1 signal in FIG. 12, whether the corresponding input STS1 signal can be cross-connected by the cross-connecting module 11.

After being cross-connected by the cross-connecting module 11, the three STS1 signals are transferred to synchronous circuits 15, 16, and 17 via interface circuits 12, 13, and 14, respectively, as in FIG. 11.

The synchronous circuits 15, 16, and 17 detect the start bits of the three STS1 signals and transfer the timings at which the start bits are detected to memories 18, 19, and 20, respectively. Consequently, the STS1 signals that are cross-connected by the cross-connecting module 11 are stored in the memories 18 to 20 on the basis of the start bit detection timings.

The STS1 signals thus stored in the memories 18 to 20 are sequentially read out from the memories 18 to 20 under the control of a read controller 21 and byte-interleave-multiplexed by a multiplexer 26.

The STS1 signal rate is 51.84 Mbps. To increase the efficiency of the transmission, the STS1 signals are multiplexed to the higher rate signal. An STS3 signal formed by multiplexing three STS1 signals.

As illustrated in FIG. 3, in an STS3 signal (to be referred to as a concatenation signal hereinafter) to be processed in this method, the data of each of three STS1 signals described above is handled as single data. Therefore, the bytes H1 and H2 of the pointers of each of the second and third STS1 signals are replaced with bytes H1* and H2* of fixed values, respectively.

The fixed value of the byte H1 is "10010011" [to be referred to as 93(HEX) hereinafter], and the fixed value of the byte H2* is "11111111" [to be referred to as FF(HEX) hereinafter].

In performing data transmission in accordance with the above method, this concatenation signal is byte-interleave-demultiplexed by the demultiplex circuit 2 and stored in the elastic memories 3 to 5 in the same manner as in the above-mentioned processing.

Since, however, the pointers of the second and third STS1 signals which are byte-interleave-demultiplexed by the demultiplex circuit 2 have the bytes H1* and H2* of fixed values, the interface circuits 9 and 10 determine that these pointers exceed a cross-connectable range.

It is therefore impossible to cross-connect the second and third STS1 signals by the cross-connecting module 11.

In the conventional cross-connecting module discussed above, if the signal to be processed is the concatenation signal in which the data of each of three STS1 signals is handled as single data, the interface circuits arranged before the cross-connecting module determine that the pointers of the second and third STS1 signals that are byte-interleave-demultiplexed by the demultiplex circuit exceed the cross-connectable range. Consequently, these signals cannot be cross-connected, and this makes transmission of the concatenation signal impossible.

SUMMARY OF THE INVENTION

It is an object of the present invention to provide a cross-connecting module capable of cross-connecting and transmitting a concatenation signal.

In order to achieve the above object according to the present invention, there is provided a cross-connecting module comprising demultiplexing means for sequentially byte-interleave-demultiplexing multiplexed transmission data into a plurality of demultiplexed data, first replacing means for replacing pointer information indicating a leading address of a data storage area of each of the second and subsequent demultiplexed data, which are byte-interleave-demultiplexed by the demultiplexing means, with pointer information indicating a leading address of a data storage area of the first demultiplexed data, cross-connecting means for cross-connecting the first demultiplexed data from the demultiplexing means with the second and subsequent demultiplexed data from the first replacing means, second replacing means for replacing the pointer information of each of the second and subsequent demultiplexed data from the cross-connecting means with a preset specific value, and multiplexing means for byte-interleave-multiplexing the first demultiplexed data from the cross-connecting means with the second and subsequent demultiplexed data from the second replacing means.

BRIEF DESCRIPTION OF THE DRAWINGS

FIGS. 4A, 4B, and 4C are views showing examples of the formats of the first, second, and third STS1 signals, respectively, which are demultiplexed by a demultiplex circuit shown in FIG. 1;

FIG. 5 is a view showing an example of the format of the second and third STS1 signals to be applied to the cross-connecting module in FIG. 1;

FIGS. 9A to 9J are timing charts for explaining the operations of the synchronous circuits, the memory circuits, and the read controller shown in FIG. 8;

DESCRIPTION OF THE PREFERRED EMBODIMENTS

An embodiment of the present invention will be described below.

Figure 1:
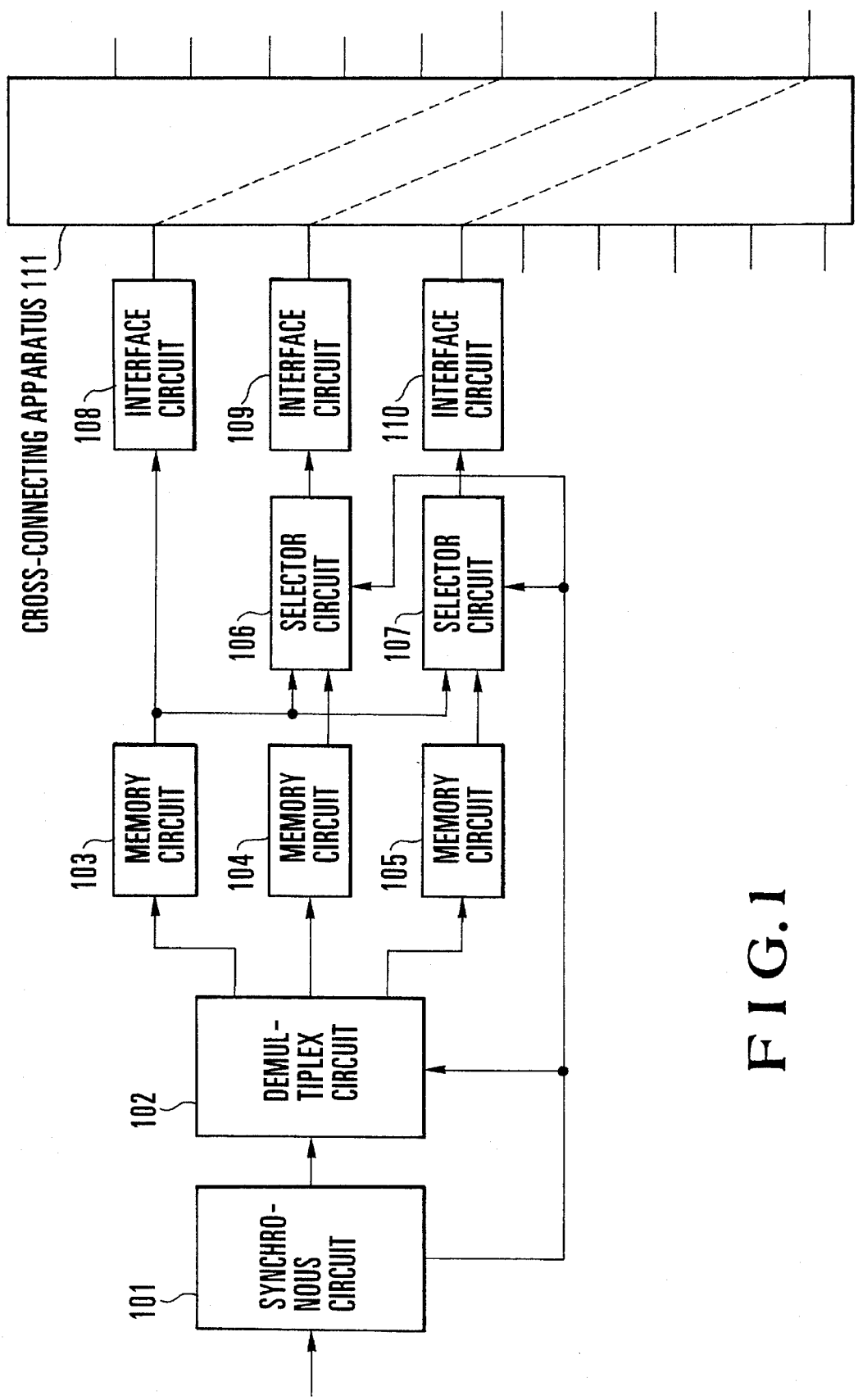
FIG. 1 is a block diagram showing an embodiment of the demultiplex circuit side of a cross-connecting module of the present invention.
Figure 2:
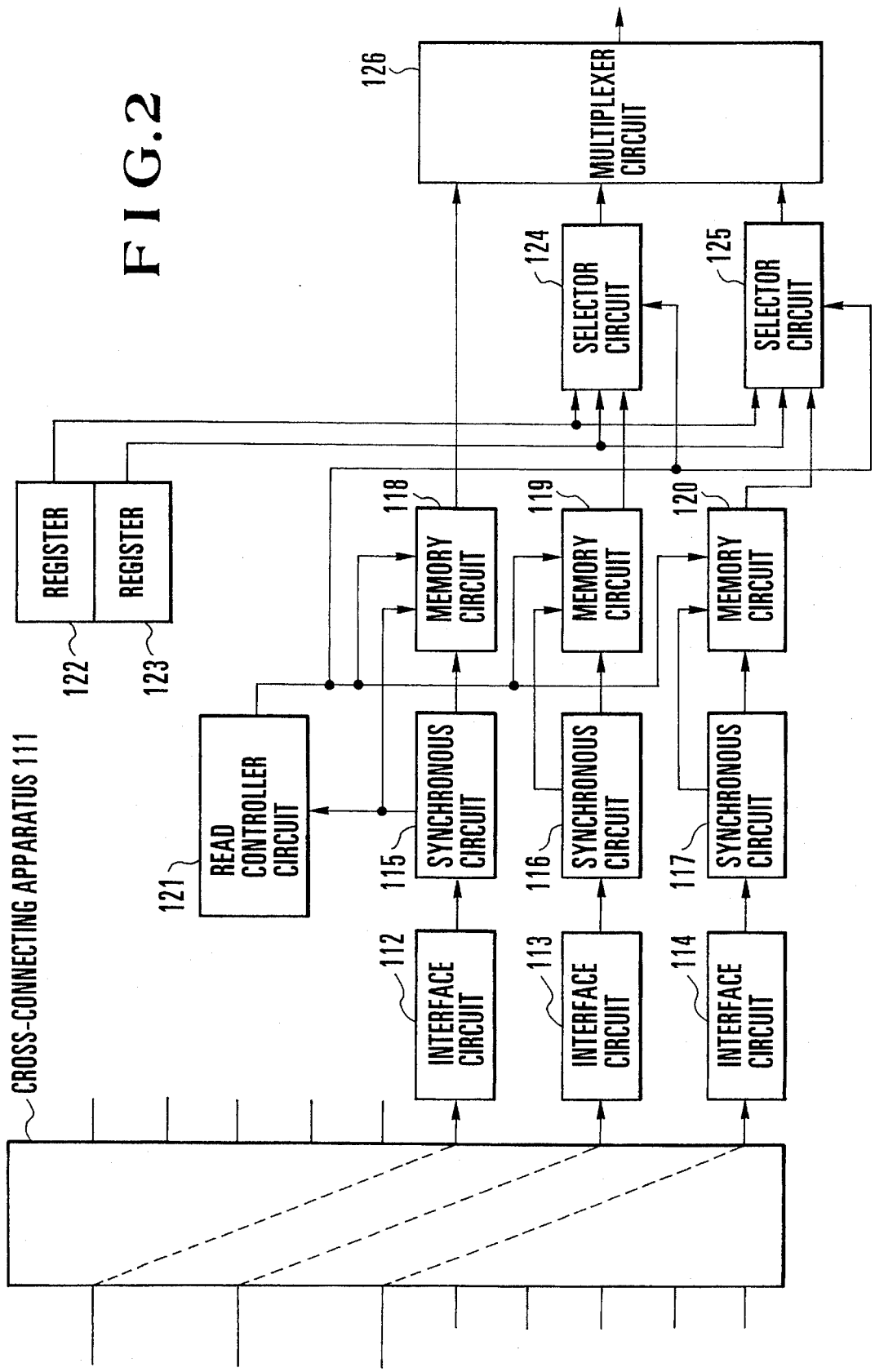
FIG. 2 is a block diagram showing an embodiment of the multiplexer side of the cross-connecting module of the present invention.

FIGS. 1 and 2 show the arrangement of an embodiment of the present invention. FIG. 1 shows the arrangement of the demultiplex circuit side of a cross-connecting module according to the embodiment of the present invention. FIG. 2 shows the arrangement of the multiplexer side of the cross-connecting module of the embodiment.

Referring to FIG. 1, a synchronous circuit 101 detects the start bit of an input concatenation signal and outputs the detection result to a demultiplex circuit 102 and selectors 106 and 107.

On the basis of the start bit detected by the synchronous circuit 101, the demultiplex circuit 102 byte-interleave-demultiplexes the concatenation signal applied via the synchronous circuit 101 into three STS1 signals. The demultiplex circuit 102 outputs the first, second, and third STS1 signals to elastic memories 103, 104, and 105, respectively.

In this embodiment, data are simultaneously read out from the elastic memories 103 to 105 in order to absorb the phase differences between the three STS1 signals which are byte-interleave-demultiplexed by the demultiplex circuit 102, and data storage amounts in these memories are increased or decreased upon data write or data read. The first STS1 signal stored in the elastic memory 103 is directly output to an interface circuit 108.

The second and third STS1 signals stored in the elastic memories 104 and 105 are output to selectors 106 and 107, respectively. The selector 106 selects one of the second STS1 signal stored in the elastic memory 104 and the first STS1 signal stored in the elastic memory 103 and outputs the selected signal to an interface circuit 109. The selector 107 selects one of the third STS1 signal stored in the elastic memory 105 and the first STS1 signal stored in the elastic memory 103 and outputs the selected signal to an interface circuit 110.

More specifically, the selector 106 (107) finds the positions of bytes H1* and H2* of the pointers of the second (third) STS1 signal on the basis of the start bit detected by the synchronous circuit 101. The selector 106 (107) selects bytes H1 and H2 of the pointers of the first STS1 signal at the positions of these H1* and H2* bytes and outputs the signal to the interface circuit 109 (110).

Note that the byte H1 has a fixed value of "10010011" [to be referred to as 93(HEX) hereinafter], and the byte H2* has a fixed value of "11111111" [to be referred to as FF(HEX) hereafter].

At positions other than the above ones, the selectors 106 and 107 directly select the second and third STS1 signals stored in the elastic memories 104 and 105 and output the signals to the interface circuits 109 and 110, respectively.

The interface circuits 108, 109, and 110, therefore, determine that the STS1 signals from the elastic memory 103, the selector 106, and the selector 107, respectively, can be cross-connected by a cross-connecting module 111. Consequently, these STS1 signals are cross-connected by the cross-connecting module 111.

In FIG. 2, interface circuits 112, 113, and 114 output the STS1 signals cross-connected by the cross-connecting module 111 to synchronous circuits 115, 116, and 117, respectively. The synchronous circuits 115, 116, and 117 detect the start bits of the respective STS1 signals and transfer the timings at which the start bits are detected to memory circuits 118, 119, and 120, respectively.

On the basis of the start bit detection timings supplied from the synchronous circuits 115 to 117, the memory circuits 118 to 120 store the STS1 signals that are cross-connected by the cross-connecting module 111. Note that the memory circuits 118 to 120 are used to synchronize the phases of the three STS1 signals cross-connected by the cross-connecting module 111.

A read controller 121 sends a read control signal to the memory circuits 118 to 120 and selectors 124 and 125 to control the readout of the STS1 signals stored in the memory circuits 118 to 120 and the selecting operations of the selectors 124 and 125.

In accordance with the read control signal from the read controller 121, the selector 124 (125) selects "93(HEX)" stored in a register 122 at the position of the byte H1 of the pointer of the second (third) STS1 signal, and selects "FF(HEX)" stored in a register 123 at the position of the byte H2 of the pointer of the second (third) STS1 signal. The selectors 124 and 125 output the signals thus selected to a multiplexer 126.

At positions other than those described above, the selectors 124 and 125 select the second and third STS1 signals stored in the memory circuits 119 and 120, respectively, and output the signals to the multiplexer 126. Therefore, the multiplexer 126 byte-interleave-multiplexes the first STS1 signal from the memory circuit 118 with the second and third STS1 signals from the selectors 124 and 125, respectively, in each of which the byte H1 of the pointer is replaced with "93(HEX)" and the byte H2 of the pointer is replaced with "FF(HEX)".

Figure 3:
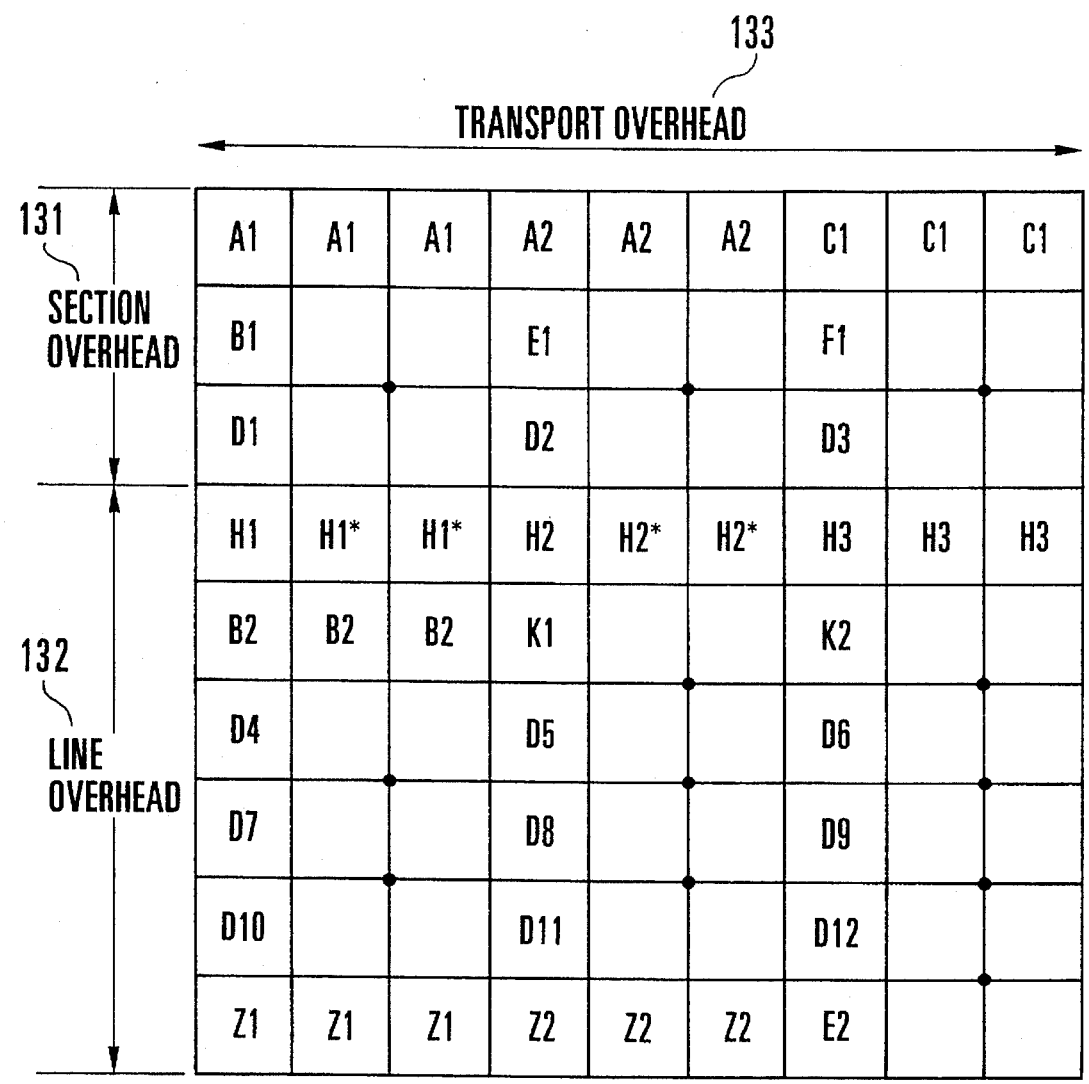
FIG. 3 is a view showing an example of the format of the overhead of a concatenation signal to be cross-connected.

FIG. 3 shows the format of the overhead of the concatenation signal which is cross-connected in this embodiment of the present invention. Referring to FIG. 3, the overhead of the concatenation signal consists of transport overhead 133 including section overhead 131 and line overhead 132.

Bytes H1 and H2 corresponding to the first STS1 signal are the pointers of the data area of the first STS1 signal. Bytes H1* and H2* corresponding to each of the second and third STS1 signals are the pointers of the data area of each of the second and third STS1 signals.

In the concatenation signal, however, the data areas of the second and third STS1 signals follow the data area of the first STS1 signal. Therefore, the bytes H1* and H2* as the pointers of each of the second and third signals are given fixed values of "93(HEX)" and "FF(HEX)," respectively.

FIGS. 4A to 4C illustrate the formats of the STS1 signals demultiplexed by the demultiplex circuit 102 shown in FIG. 1. That is, FIGS. 4A, 4B, and 4C show the formats of the first, second, and third STS1 signals, respectively, demultiplexed by the demultiplex circuit 102.

Figure 5:
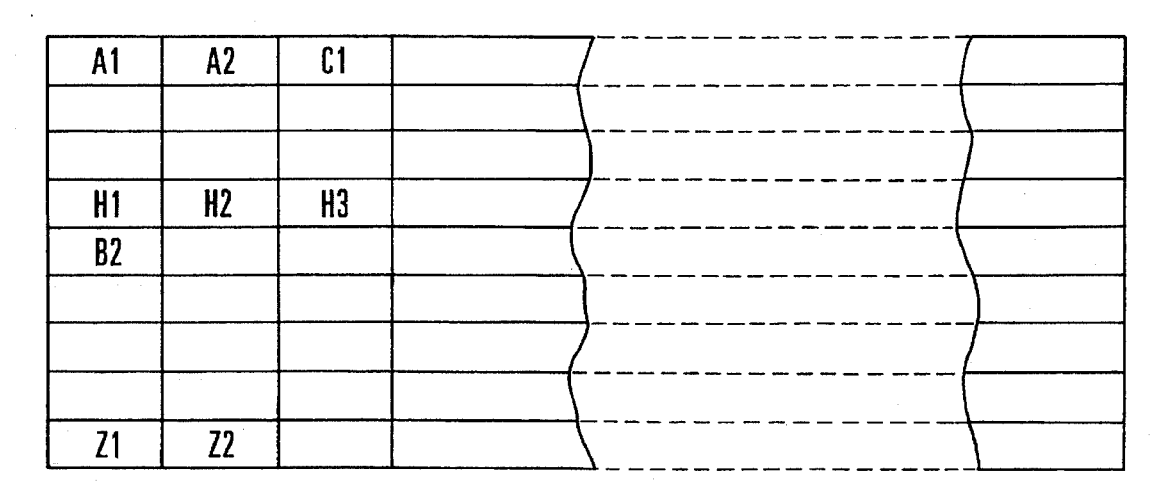

FIG. 5 illustrates the format of the second and third STS1 signals input to the cross-connecting module 11 shown in FIG. 1. In FIG. 5, the bytes H1* and H2* of the pointers of the second (third) STS1 signal are replaced by the bytes H1 and H2 of the pointers of the first STS1 signal by the selector 106 (107).

That is, in the case of the second STS1 signal in FIG. 4B, the bytes H1* and H2* are replaced with the bytes H1 and H2 of the pointers of the first STS1 signal, resulting in the format as in FIG. 5.

Likewise, in the case of the third STS1 signal in FIG. 4C, the bytes H1* and H2* are replaced with the bytes H1 and H2 of the pointers of the first STS1 signal, resulting in the format as in FIG. 5.

The operation of the above embodiment of the present invention will be described below with reference to FIGS. 1 to 5. Upon receiving the concatenation signal, the synchronous circuit 101 detects the start bit of the input signal and outputs the detection result to the demultiplex circuit 102 and the selectors 106 and 107.

On the basis of the start bit detected by the synchronous circuit 101, the demultiplex circuit 102 byte-interleave-demultiplexes the concatenation signal into three STS1 signals and outputs the resulting first, second, and third STS1 signals to the elastic memories 103, 104, and 105, respectively.

The first STS1 signal stored in the elastic memory 103 is directly output to the interface circuit 108. The second and third STS1 signals stored in the elastic memories 104 and 105 are output to the selectors 106 and 107, respectively, in synchronism with the phase of the first STS1 signal.

The selector 106 (107) selects one of the second (third) STS1 signal stored in the elastic memory 104 (105) and the first STS1 signal stored in the elastic memory 103 and outputs the selected signal to the interface circuit 109 (110).

More specifically, the selector 106 (107) finds the positions of bytes H1* and H2* of the pointers of the second (third) STS1 signal on the basis of the start bit detected by the synchronous circuit 101. The selector 106 (107) selects bytes H1 and H2 of the pointers of the first STS1 signal at the positions of these H1* and H2* bytes and outputs the selected bytes to the interface circuit 109 (110).

Consequently, the bytes H1* and H2* of each of the second and third signals shown in FIGS. 4B and 4C are replaced by the bytes H1 and H2 of the pointers of the first STS1 signal. The result is the format as illustrated in FIG. 5.

At positions other than the above ones, the selectors 106 and 107 select the second and third STS1 signals stored in the elastic memories 104 and 105 and output the signals to the interface circuits 109 and 110, respectively.

The interface circuits 108, 109, and 110, therefore, determine that the STS1 signals from the elastic memory 103, the selector 106, and the selector 107, respectively, can be cross-connected by the cross-connecting module 111. Consequently, these STS1 signals are cross-connected by the cross-connecting module 111.

The STS1 signals cross-connected by the cross-connecting module 111 are output to the synchronous circuits 115, 116, and 117 via the interface circuits 112, 113, and 114, respectively. The synchronous circuits 115, 116, and 117 detect the start bits of the respective STS1 signals and transfer the timings at which the start bits are detected to the memory circuits 118, 119, and 120, respectively.

On the basis of the start bit detection timings supplied from the synchronous circuits 115 to 117, the memory circuits 118 to 120 store the STS1 signals that are cross-connected by the cross-connecting module 111.

The read controller 121 sends a read control signal to the memory circuits 118 to 120 and selectors 124 and 125 to control the readout of the STS1 signals stored in the memory circuits 118 to 120 and the selecting operations of the selectors 124 and 125.

In accordance with the read control signal from the read controller 121, the selector 124 (125) selects "93(HEX)" stored in the register 122 at the position of the byte H1 of the pointer of the second (third) STS1 signal, and selects "FF(HEX)" stored in the register 123 at the position of the byte H2 of the pointer of the second (third) STS1 signal. The selectors 124 and 125 output the signals thus selected to the multiplexer 126.

Consequently, the bytes H1 and H2 of the second and third STS1 signals, which are cross-connected by the cross-connecting module 111 after being replaced by the format as in FIG. 5, are again replaced by the bytes H1* and H2*, returning to the formats as shown in FIGS. 4B and 4C.

At positions other than those described above, the selectors 124 and 125 directly select the second and third STS1 signals stored in the memory circuits 119 and 120, respectively, and output the signals to the multiplexer 126.

The multiplexer 126, therefore, byte-interleave-multiplexes the first STS1 signal from the memory circuit 118 with the second and third STS1 signals from the selectors 124 and 125, respectively, in each of which the byte H1 of the pointer is replaced with "93(HEX)" and the byte H2 of the pointer is replaced with "FF(HEX)".

As discussed above, of the three STS1 signals which are byte-interleave-demultiplexed by the demultiplex circuit 102, the bytes H1* and H2* of the second and third STS1 signals are replaced with the bytes H1 and H2 of the first STS1 signal by the selectors 106 and 107. Thereafter, these signals are cross-connected by the cross-connecting module 111. The cross-connected signals are then byte-interleave-multiplexed by the multiplexer 126 after the bytes H1 and H2 of the cross-connected second and third STS1 signals are replaced with preset bytes H1* and H2* by the selectors 124 and 125. As a result, it is possible to cross-connect the concatenation signal having a unit data quantity equal to that of an STS3 signal which is obtained by multiplexing three STS1 signals. This makes transmission of the concatenation signal possible.

In the above embodiment of the present invention, STS1 and STS3 signals as logic signals have been discussed. However, it is evident that OC (Optical Carrier) 1 and OC3 signals that are physical signals corresponding to these STS1 and STS3 signals can be similarly processed by performing conversion from optical to electrical signals or vice versa.

Therefore, the present invention is not limited to the above embodiment.

Figure 6:
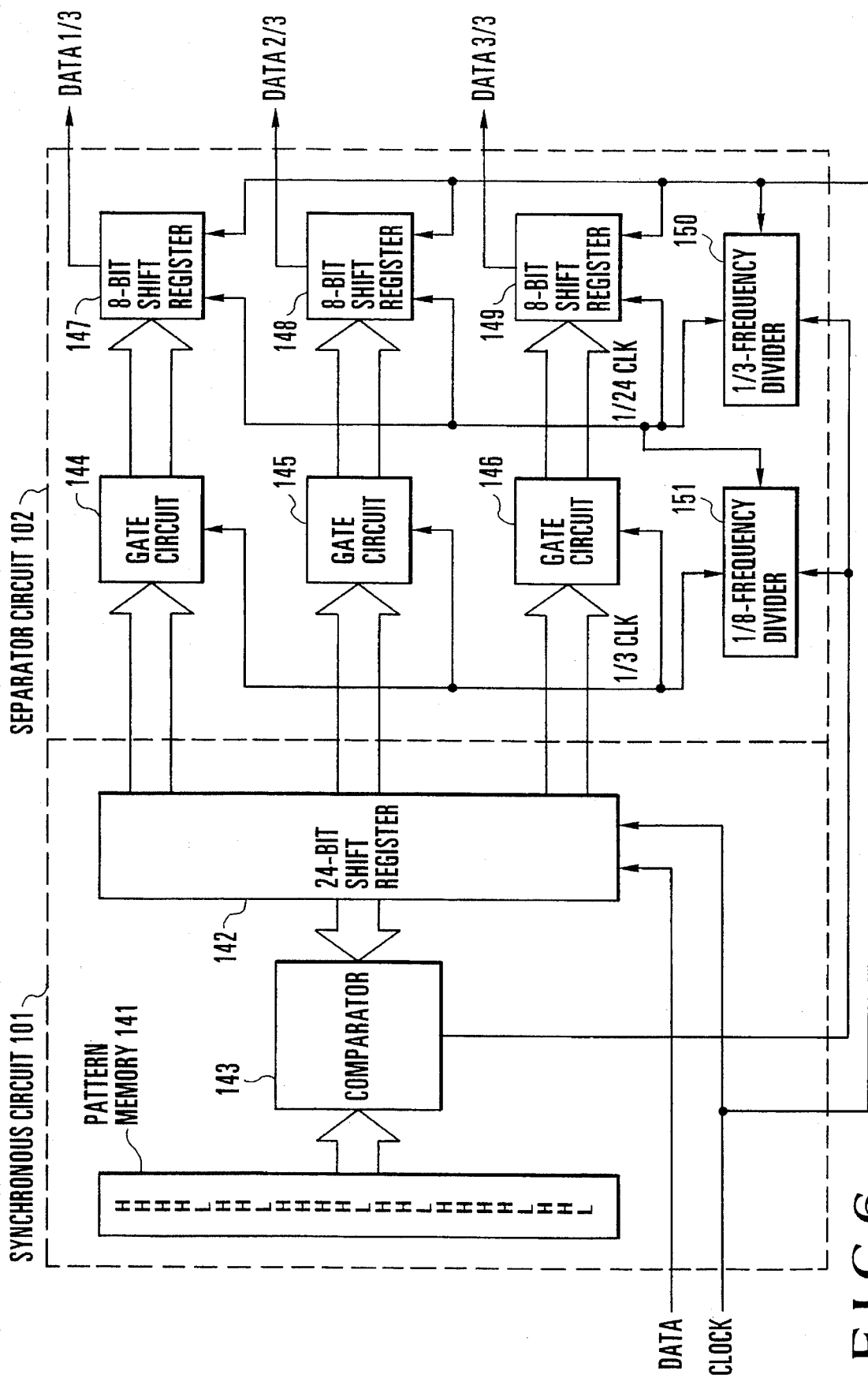
FIG. 6 is a block diagram showing examples of a synchronous circuit and the demultiplex circuit shown in FIG. 1.

FIG. 6 is a block diagram of the synchronous circuit 101 and the demultiplex circuit 102 shown in FIG. 1. The synchronous circuit 101 is constituted by a pattern memory 141, a 24-bit shift register 142, and a comparator 143. The pattern memory 141 stores a 24-bit data string (1 frame) consisting of a bit pattern of predetermined logic "H" and logic "L". The 24-bit shift register 142 serially reads in 24-bit input data in response to the clock. The comparator 143 compares, bit by bit, the pattern stored in the pattern memory 141 with the input data read in by the 24-bit shift register 142, and outputs a frame timing signal to the demultiplex circuit 102 if the two patterns are in agreement. The demultiplex circuit 102 is constituted by gate circuits 144 to 146, 8-bit shift registers 147 to 149, a ⅓-frequency divider 150, and a ⅛-frequency divider 151. The gate circuits 144 to 146 divide the parallel output from the 24-bit shift register into three 8-bit (1-byte) portions and transfer these 8-bit outputs. The 8-bit shift registers 147, 148, and 149 perform parallel-serial conversion for the 8-bit outputs from the gate circuits 144, 145, and 146, respectively, in response to the clock, and outputs data ⅓, ⅔, and 3/3, respectively, each corresponding to an STS1 signal. The ⅓-frequency divider 150 is reset by the frame timing signal from the comparator 143 and frequency-divides the clock to output a ⅓-frequency-divided clock ⅓CLK. The ⅛-frequency divider 151 ⅛-frequency-divides the ⅓-frequency-divided clock ⅓CLK from the ⅓-frequency divider 150 and outputs a 1/24-frequency-divided clock 1/24CLK to the gate circuits 144 to 146.

Figure 7:
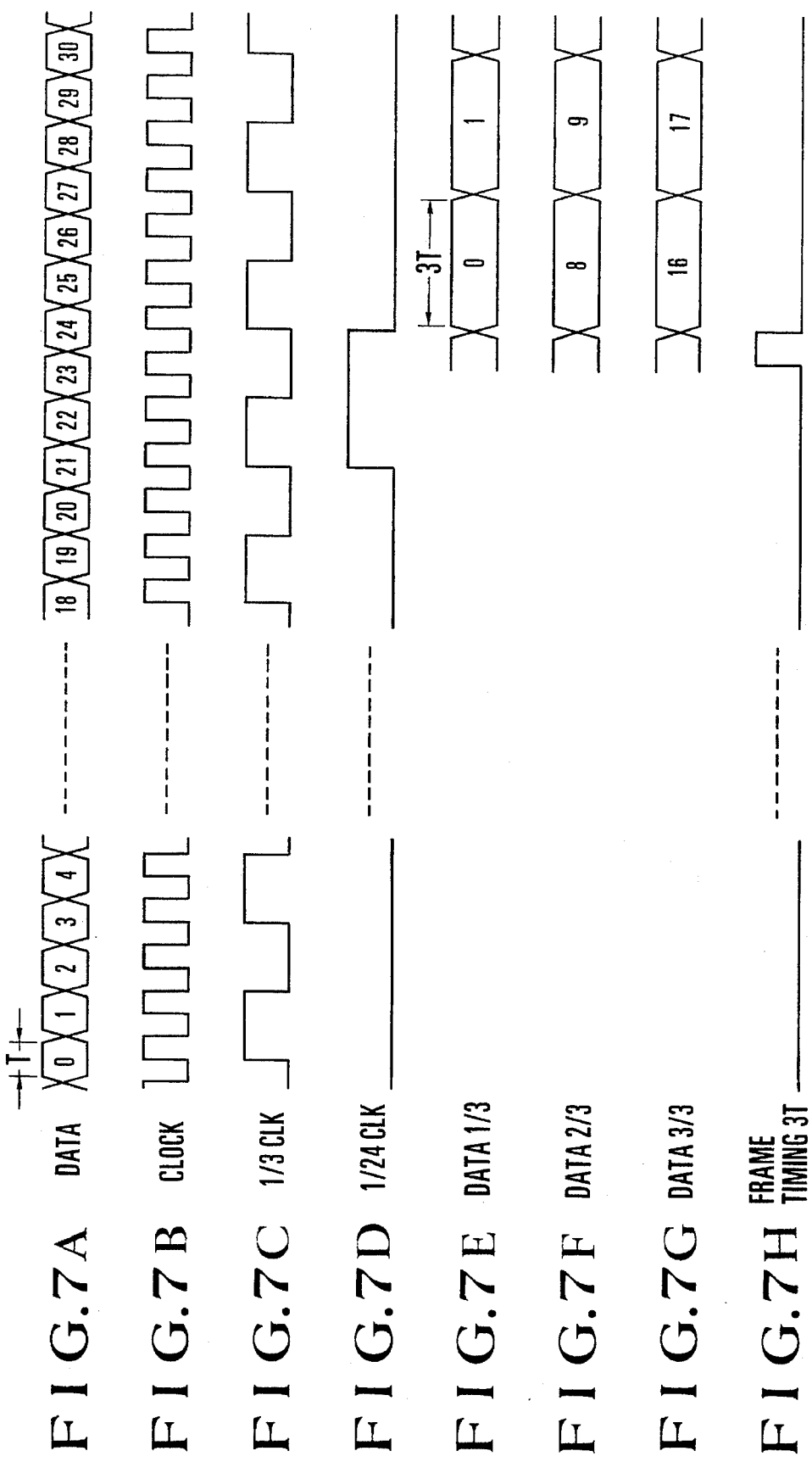
FIGS. 7A to 7H are timing charts for explaining the operations of the synchronous circuit and the demultiplex circuit in FIG. 6.

The operations of the synchronous circuit 101 and the demultiplex circuit 102 with the above arrangements will be described below with reference to timing charts in FIGS. 7A to 7H. The 24-bit shift register 142 of the synchronous circuit 101 serially reads in the 0th to nth bits of input data (FIG. 7A) which corresponds to a concatenation signal on the basis of the clock of period T (FIG. 7B). The comparator 143 compares the content of the 24-bit shift register with the predetermined pattern data stored in the pattern memory 141. If the two data are in agreement, the comparator 143 outputs a frame timing signal shown in FIG. 7H. That is, the synchronous circuit 101 finds out the predetermined data string which is periodically written for each frame in the input signal, and outputs the frame timing signal.

The ⅓-frequency divider 150 and the ⅛-frequency divider 151 of the demultiplex circuit 102 are reset at the start of each frame by the frame timing signal (FIG. 7H) from the synchronous circuit 101. Thereafter, the 24-bit shift register 142 reads in input data of 24 bits from the 0th to 23rd bits. Consequently, the gates of the gate circuits 144 to 146 are enabled by the frequency-divided clock 1/24CLK (FIG. 7C) from the ⅛-frequency divider 151, and the parallel output from the 24-bit shift register 142 is read in in an 8-bit parallel fashion by the three 8-bit shift registers 147 to 149 via the gates 144 to 146. The 0th to 7th bits, the 8th to 15th bits, and the 16th to 23rd bits of the input data read in by the 8-bit shift registers 147, 148, and 149, respectively, are simultaneously read out bit by bit in accordance with the 1/24-frequency-divided clock 1/24CLK (FIG. 7D) and transferred as DATA ⅓, ⅔, and 3/3, respectively. When the data read in by the 8-bit shift registers 147 to 149 are completely output, the 24th to 47th bits of the input data, which are read in by the 24-bit shift register 142 during the above processing, are similarly transferred to the 8-bit shift registers 147 to 149 and output as DATA ⅓ to 3/3. This operation is repeatedly executed until frames are ended.

More specifically, the 8-bit shift register 147 outputs the 0th to 7th bits, 24th to 31st bits, 48th to 55th bits, . . . , of the input data; the 8-bit shift register 148 outputs the 8th to 15th bits, 32nd to 49th bits, 56th to 63rd bits, . . . , of the input data; and the 8-bit shift register 149 outputs the 16th to 23rd bits, 40th to 47th bits, 64th to 71st bits, . . . , of the input data. The output period of DATA ⅓, ⅔, and 3/3 is 3T.

As described above, the demultiplex circuit 102 performs DEMUX (demultiplex) for single input data, i.e., demultiplexes the data into three 8-bit DATA ⅓ to 3/3. The frame timing signal from the synchronous circuit 101 is used to determine which 8 bits of the input data are to be output as DATA ⅓ by the demultiplex circuit 102. This operation of the demultiplex circuit 102 is termed byte interleave DEMUX in that input data is time-divisionally demultiplexed every 8 bits (1 byte).

Figure 8:
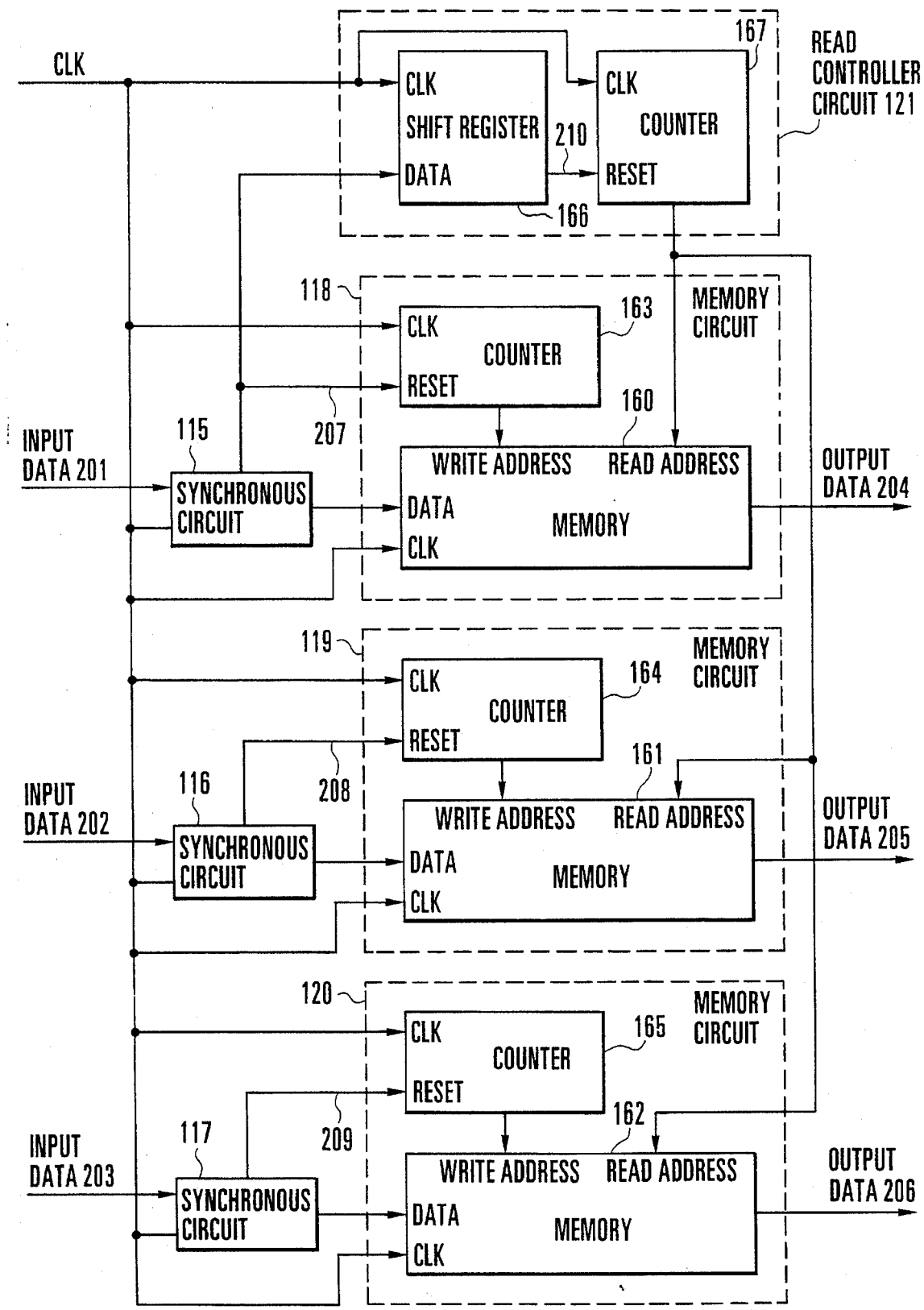
FIG. 8 is a block diagram showing an example of synchronous circuits, memory circuits, and a read controller in FIG. 2.
Figure 10:
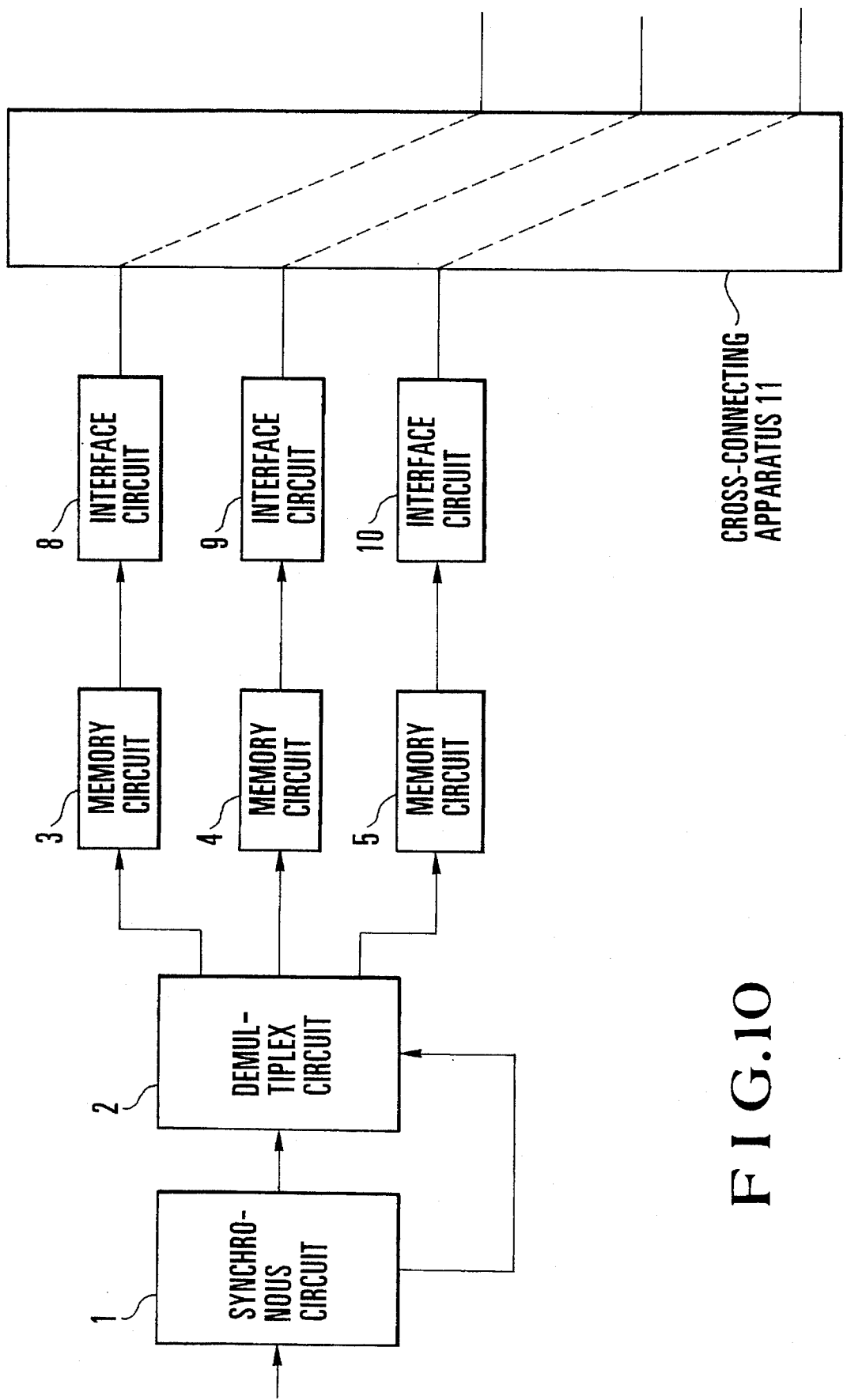
FIG. 10 is a block diagram showing the demultiplex circuit side of a conventional cross-connecting module.
Figure 11:
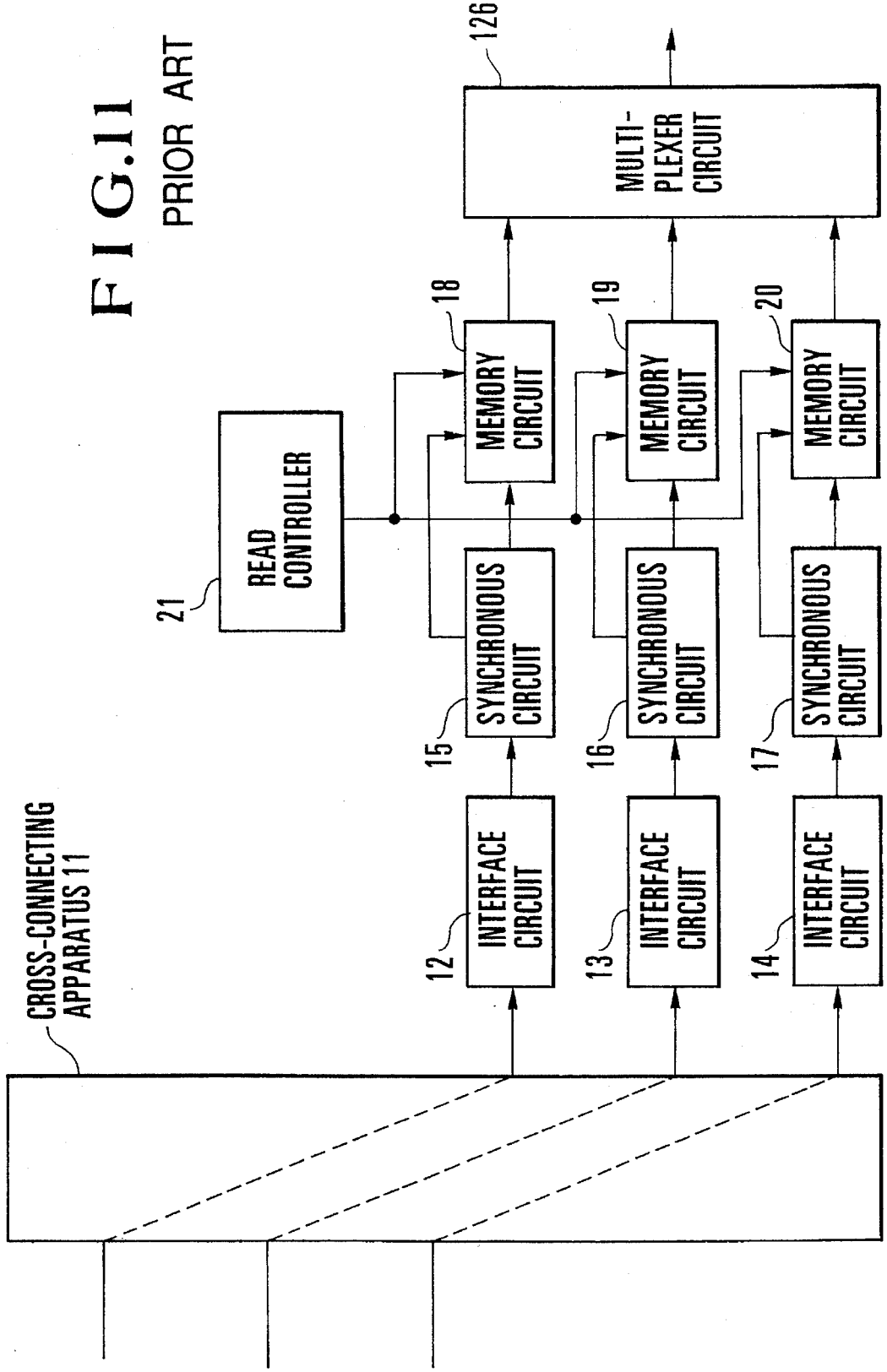
FIG. 11 is a block diagram showing the multiplexer side of the conventional cross-connecting module.
Figure 12:
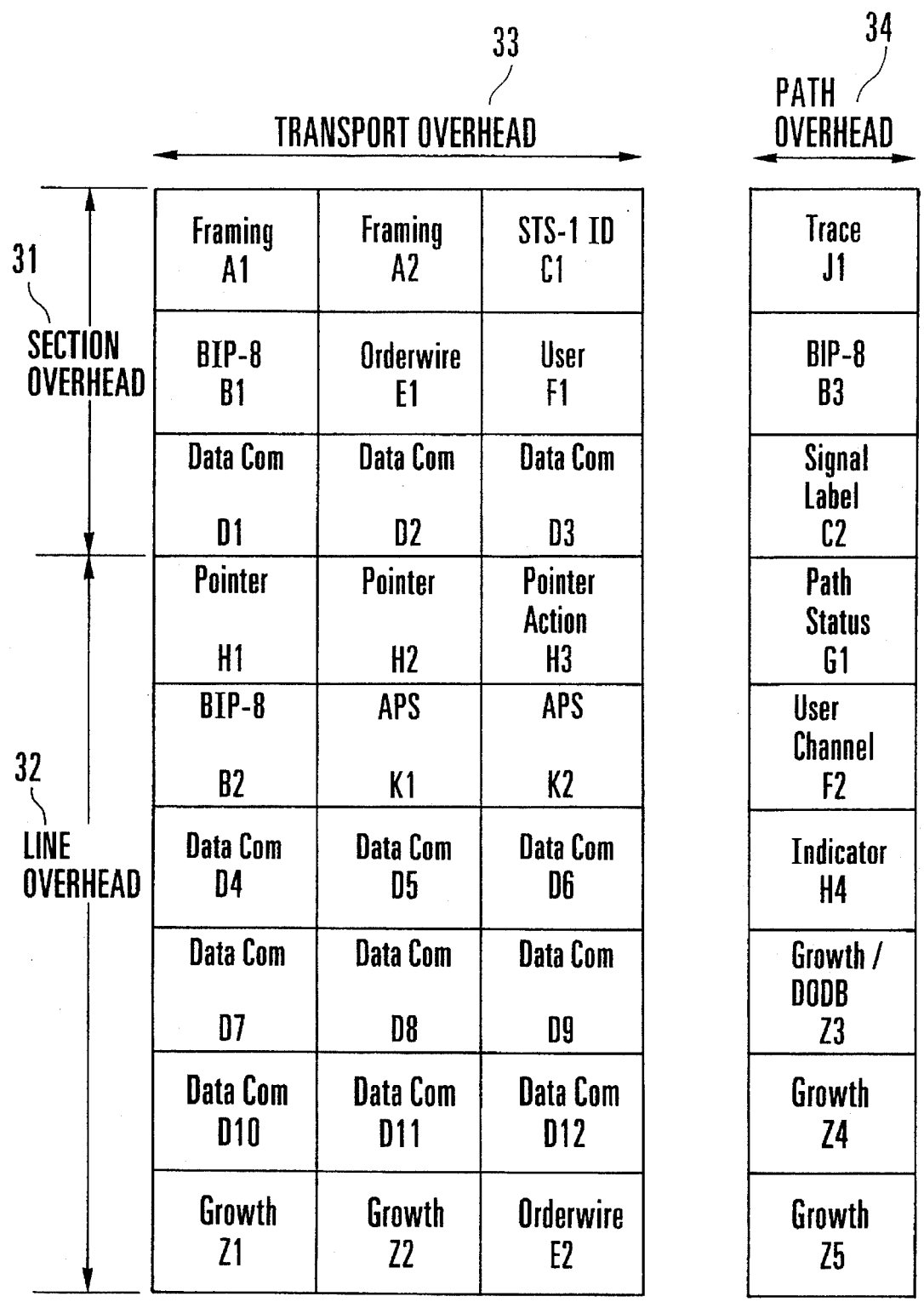
FIG. 12 is a view showing the format of the overhead of a conventional STS1 signal.
Figure 13:
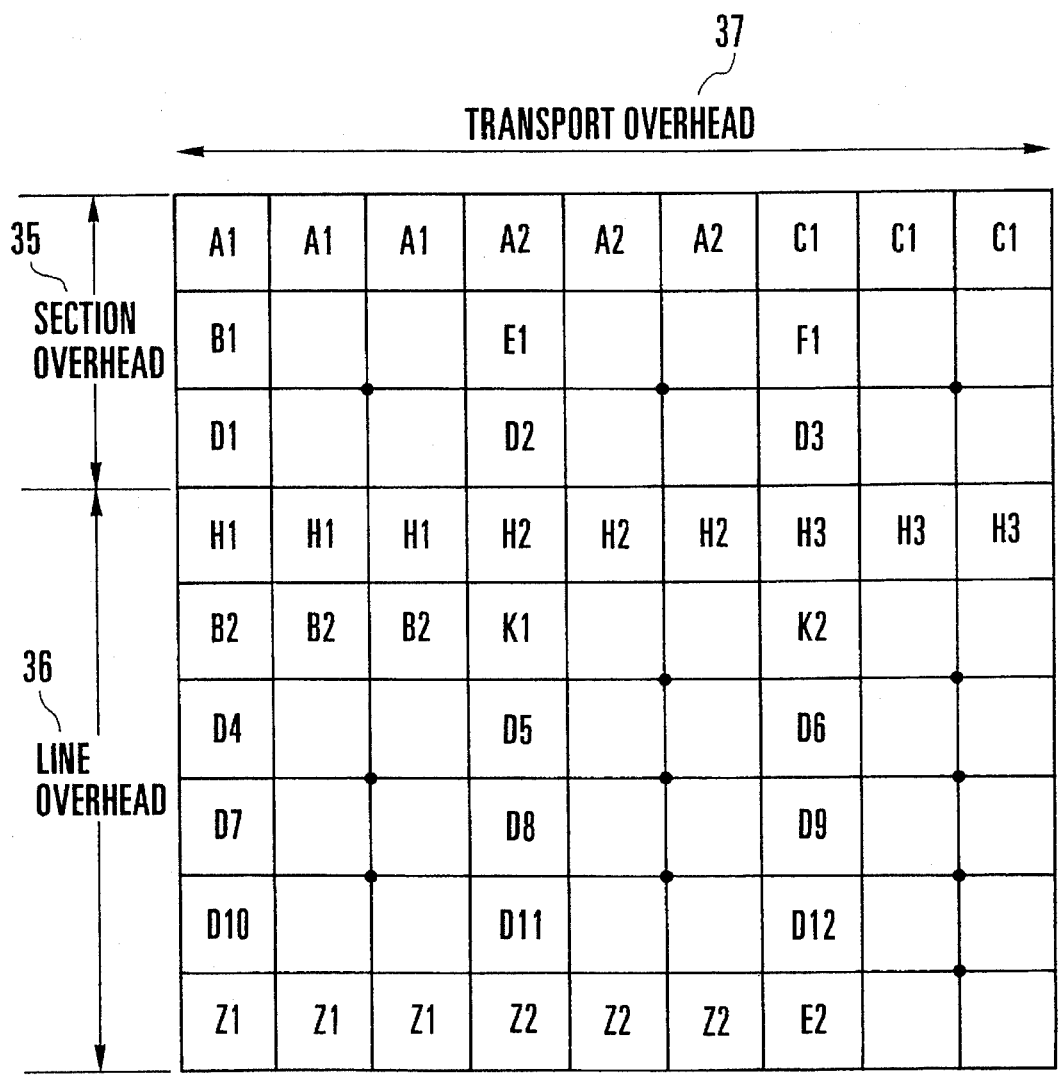
FIG. 13 is a view showing the format of the overhead of a conventional STS3 signal.

FIG. 8 is a block diagram of the synchronous circuits 115 to 117, the memory circuits 118 to 120, and the read controller 121 illustrated in FIG. 2. Referring to FIG. 8, the memory circuits 118 to 120 consist of memories 160 to 162 and counters 163 to 165. Data from the synchronous circuits 115 to 117 are written in and read out from the memories 160 to 162 in response to the clock CLK. The counters 163 to 165 are reset by the frame timing signals indicating the output frame timings from the synchronous circuits 115 to 117. The counters 163 to 165 also count the clocks CLK to supply write addresses to the memories 160 to 162. The read controller 121 is constituted by a shift register 166 and a counter 167. The shift register 166 functions as a delay circuit which reads in the frame timing signal from the synchronous circuit 115 and shifts the signal a predetermined number of bits, i.e., delays the signal a predetermined time in response to the clock CLK, thereby outputting the delayed signal. The counter 167 is reset by the delayed signal from the shift register 166 and counts the clocks CLK to supply a common read address to the memories 160 to 162.

The operations of the synchronous circuits 115 to 117, the memory circuits 118 to 120, and the read controller 121 with the above arrangement will be described below with reference to FIGS. 9A to 9J. The synchronous circuits 115, 116, and 117 output frame timing signals 207, 208, and 209 shown in FIGS. 9A, 9C, and 9E for input data 201, 202, and 203 shown in FIGS. 9B, 9D, and 9F, respectively. The counters 163, 164, and 165 are reset by the frame timing signals 207, 208, and 209 to output write addresses to the memories 160, 161, and 162, respectively. In accordance with the write addresses, the input data 201, 202, and 203 are written in the memories 160, 161, and 162 via the synchronous circuits 115, 116, and 117, respectively.

The shift register 166 of the read controller 121 is reset by the frame timing signal from the synchronous circuit 115 to output a delayed signal 210 (FIG. 9G) which is delayed a predetermined time from the frame timing signal 207, to the counter 167. Note that, in order to match the frame phases of the input data 202 and 203 with the phase Of the input data 201, the delay time of the shift register 166 need only be the phase difference or more between the input data 202 and 203. The counter 167 is reset by the delayed signal shown in FIG. 9G from the shift register 166 to output a common read address to the memories 160 to 162. Data are read out from the memories 160 to 162, starting at the respective start addresses, in accordance with the read address from the counter 167, and as a result 8-bit output data 204 to 206 (FIGS. 9H to 9J) are simultaneously output. That is, the read controller 121 causes the frame phases of the three input data 201 to 203 of each different phase to agree with each other by delaying these phases.

According to the present invention as has been discussed above, multiplexed data obtained by multiplexing transmission data is byte-interleave-demultiplexed. Pointer information indicating the leading address of the data storage area of each of the second and subsequent data thus demultiplexed is replaced with the pointer information of the first demultiplexed data. Thereafter, these data are cross-connected. The data are then byte-interleave-multiplexed after the pointer information of each of the second and subsequent demultiplexed data is replaced with a preset specific value. This allows cross-connection of a concatenation signal constituting the multiplexed data, making transmission of the concatenation signal possible.

What is claimed is:

1. A cross-connecting module comprising:

demultiplexing means for sequentially byte-interleave-demultiplexing multiplexed transmission data into a plurality of demultiplexed data;

first replacing means for replacing pointer information indicating a leading address of a data storage area of each of second and subsequent demultiplexed data, which are byte-interleave-demultiplexed by said demultiplexing means, with pointer information indicating a leading address of a data storage area of first demultiplexed data;

cross-connecting means for cross-connecting the first demultiplexed data from said demultiplexing means with the second and subsequent demultiplexed data from said first replacing means;

second replacing means for replacing the pointer information of each of the second and subsequent demultiplexed data from said cross-connecting means with a preset specific value; and multiplexing means for byte-interleave-multiplexing the first demultiplexed data from said cross-connecting means with the second and subsequent demultiplexed data from said second replacing means.

2. A module according to claim 1, further comprising:

first synchronizing means for detecting start bit information of the transmission data to output a frame timing signal, and wherein said first replacing means finds the position of the pointer information of each of the second and subsequent demultiplexed data on the basis of the frame timing signal from said first synchronizing means, and replaces the pointer information of each of the second and subsequent demultiplexed data with the pointer information of the first demultiplexed data.

3. A module according to claim 2, further comprising:

a plurality of memories which temporarily store the demultiplexed data from said demultiplexing means and from which the demultiplexed data are simultaneously read out, and wherein said first replacing means is constituted by a two-input selector for receiving the first demultiplexed data and the second and subsequent demultiplexed data from said memories, said two-input selector selectively outputting the pointer information of the first demultiplexed data, instead of the pointer information of the second demultiplexed data, at the position of the pointer information of each of the second and subsequent demultiplexed data on the basis of the frame timing signal from said synchronizing means.

4. A module according to claim 2, wherein said demultiplexing means performs byte interleave demultiplex by which data is demultiplexed into 8-bit data on the basis of the frame timing signal from said synchronizing means.

5. A module according to claim 1, further comprising:

storage means for storing a preset specific value; and a plurality of second synchronizing means for detecting start bit information of the demultiplexed data from said cross-connecting means to independently output frame timing signals, and wherein said second replacing means finds the position of the pointer information of each of the second and subsequent demultiplexed data on the basis of a delayed signal obtained by delaying the frame timing signal from one of said second synchronizing means, which corresponds to the first demultiplexed data, and replaces the pointer information of each of the second and subsequent demultiplexed data with the preset specific value stored in said storage means.

6. A module according to claim 5, further comprising:

a plurality of memory means for independently storing the demultiplexed data from said second synchronizing means; and read control means for simultaneously reading out the demultiplexed data from said memory means at a timing delayed a predetermined time from the frame timing signal from one of second synchronizing means, which corresponds to the first demultiplexed data, and outputting the delayed signal to said second replacing means, and wherein said multiplexing means byte-interleave-multiplexes the first demultiplexed data from said memory means with the second and subsequent demultiplexed data from said second replacing means.

7. A module according to claim 6, wherein said second replacing means is constituted by a two-input selector which receives the second and subsequent demultiplexed data from said memory means and the output from said storage means, replaces the pointer information of each of the second and subsequent demultiplexed data with the preset specific value stored in said storage means at the position of the pointer information of each of the second and subsequent demultiplexed data on the basis of the delayed signal from said read control means.

8. A cross-connecting module comprising:

demultiplexing means for sequentially byte-interleave-demultiplexing an STS (Synchronous Transport Signal) 3 signal, which is formed by multiplexing three STS1 signals, into three STS1 signals;

first replacing means for replacing bytes H1 and H2 as pointer information indicating a leading address of a data storage area of each of second and third STS1 signals, which are byte-interleave-demultiplexed by said demultiplexing means, with bytes H1 and H2 as pointer information indicating a leading address of a data storage area of a first STS1 signal;

cross-connecting means for cross-connecting the first STS1 signal from said demultiplexing means with the second and third STS1 signals from said first replacing means;

second replacing means for replacing the bytes H1 and H2 as the pointer information of each of the second and third STS1 signals from said cross-connecting means with two preset specific values; and multiplexing means for byte-interleave-multiplexing the first STS1 signal from said cross-connecting means with the second and third STS1 signals from said second replacing means.

9. A module according to claim 8, further comprising:

first synchronizing means for detecting start bit information of the transmission data to output a frame timing signal, and wherein said first replacing means finds the positions of bytes H1 and H2 of each of the second and subsequent demultiplexed data on the basis of the frame timing signal from said first synchronizing means, and replaces the bytes H1 and H2 of each of the second and subsequent demultiplexed data with the bytes H1 and H2 of first demultiplexed data.

10. A module according to claim 8, further comprising:

storage means for storing two preset specific values; and a plurality of synchronizing means for detecting start bit information of the demultiplexed data from said cross-connecting means to independently output frame timing signals, and wherein said second replacing means finds the positions of the bytes H1 and H2 of each of second and subsequent demultiplexed data on the basis of a delayed signal obtained by delaying the frame timing signal from one of said synchronizing means, which corresponds to first demultiplexed data, and replaces the bytes H1 and H2 of each of the second and subsequent demultiplexed data with the two preset specific values stored in said storage means.

* * * * *

UNITED STATES PATENT AND TRADEMARK OFFICE
CERTIFICATE OF CORRECTION

PATENT NO. : 5,537,405
DATED : July 16, 1996
INVENTOR(S) : Yuuki YOSHIFUJI

It is certified that error appears in the above-indentified patent and that said Letters Patent is hereby corrected as shown below:

Column 2, line 1, delete "H1" and insert --H1*--.

Column 4, line 11, delete "H1" and insert --H1*--.

Signed and Sealed this

Fifth Day of November, 1996

*Attest:*

BRUCE LEHMAN

*Attesting Officer*     *Commissioner of Patents and Trademarks*